3,215,639
HYDROCARBON CRACKING CATALYST COMPRISING A SILICA-ALUMINA GEL CONTAINING FINELY DIVIDED CALCIUM OXIDE
Nicholas Chomitz, Yonkers, N.Y., assignor to American Cyanamid Company, Stamford, Conn., a corporation of Maine
No Drawing. Filed Aug. 1, 1963, Ser. No. 299,166
7 Claims. (Cl. 252—455)

This invention relates to a process for preparing catalysts employed in hydrocarbon conversion processes and to the catalysts so prepared. This invention also relates to such hydrocarbon conversion processes employing catalysts so prepared. In a more particular aspect, the present invention relates to a process for preparing silica-alumina-calcia catalyst.

Silica-alumina catalysts are well known for the treatment of mineral oils. Such catalysts are known to produce relatively large amounts of olefinic, isoparaffinic and cyclic hydrocarbons. Such catalysts are ordinarily desirable in the manufacture of gasolines having a high octane rating. In addition to silica-alumina type catalysts, silica-magnesia catalysts are known for producing increased quantities of olefinic and isoparaffinic hydrocarbons and an increasing amount of hydrocarbons boiling in the 200° F. to 500° F. range. Ordinarily, silica-alumina catalysts are more thermally stable and are useful for producing gasolines having a higher octane rating than those obtained from a silica-magnesia type catalyst. However, silica-magnesia catalysts normally produce less degradation of the feed stock into low grade products such as carbon and coke with a resultant higher yield of gasoline.

Composites of silica-alumina and magnesia have been known heretofore and have been employed in the catalytic treatment of petroleum hydrocarbons and such composites ordinarily have the advantage of producing gasolines having a high octane rating in good yields. Such catalysts, however, suffer from the deficiency of not affording a desirable product distribution. In other words, such composites frequently cause the production of low grade products such as carbon and coke in much the same manner as a silica-alumina catalyst alone, i.e., without the addition of magnesia as a third component.

An additional problem which has been previously faced in the use of such composites is the fact that they suffer a rapid decline in regenerability during use. It is well known, of course, that catalysts when used for cracking or otherwise converting hydrocarbon oils become deactivated by the formation on their surfaces of a coating of carbon. This coating must be steamed off or burned off in order to rejuvenate the catalyst and restore it toward its initial activity. Very frequently, however, the steaming off or burning off of the carbon on the catalyst surfaces requires an extensive period of time in especially constructed equipment. Such delay in regeneration of catalyst necessarily cuts down on the throughput and adds to the overall cost of the operation of the hydrocarbon conversion unit.

Accordingly, it is an object of the present invention to provide a silica-alumina-calcia catalyst in which the problems encountered when employing a silica-alumina-magnesia composite are to a substantial degree lessened and/or entirely eliminated.

It is a further object of this invention to provide a silica-alumina-calcia catalyst having improved selectivity and activity. Such selectivity is evidenced by an increase in the amount of production of gasoline and saleable by-products with a corresponding decrease in gas and coke products from a given cracking oil. Such activity is manifested by small or little loss of surface upon steaming or thermal treatment in much the same manner as a silica-alumina catalyst. Thus, the catalysts produced in accordance with the process of this invention possess marked advantages over silica-alumina-magnesia catalysts which, as has been pointed out hereinabove, cause problems during regeneration.

In accordance with the present invention, it has now been discovered that a very desirable silica-alumina-calcia catalyst may be produced by adding finely divided calcium oxide to a washed silica-alumina hydrogel or xerogel. The calcium oxide containing hydrogel or xerogel then is dried and acitvated by heating at a temperature of 800° F. to 1400° F.

In accordance with this invention, a silica-alumina-calcia catalyst is prepared by adding finely divided calcium oxide previously calcined at about 1000° C., preferably as a powder, to a silica-alumina hydrogel or to a slurry of silica-alumina hydrogel or xerogel, containing from about 12 to 30% $Al_2O_3$ and preferably from about 23 to 28% $Al_2O_3$. The amount of calcium oxide which may be reacted with such silica-alumina hydrogel or xerogel is ordinarily such so as to provide from about 1 to about 10% calcium oxide in the finished catalyst which then also contains from about 10 to about 30% alumina. Such level of calcium oxide in the silica-alumina-calcia composite affords marked changes in the cracked hydrocarbon distribution. Such distribution changes are in the direction of increased yield of olefins such as propenes and butenes. In addition, at the various levels of calcium oxide incorporation, the gasoline yield is noted to increase while the carbon or coke production decreases. As contrasted with a silica-alumina-magnesia catalyst, a substantially better distribution of products is obtained with the catalyst of this invention. Such improvement in product distribution can be measured by the ratio of unsaturated hydrocarbons to saturated hydrocarbons, the ratio of gasoline to unsaturated hydrocarbons and the ratio of gasoline to coke. These ratios readily point up the fact that the catalyst prepared by the process of this invention is superior to a silica-alumina-magnesia catalyst as well as to a catalyst containing silica-alumina only.

The silica-alumina hydrogel or xerogel to be employed in preparing the silica-alumina-calcia catalyst in the process of this invention may be obtained by any of a number of methods. Thus, for example, such silica-alumina gels may be manufactured by coprecipitating the silica and the alumina by mixing a soluble silicate with a solution of a soluble aluminum salt under conditions of a pH adapted to cause the formation of the precipitate. In such coprecipitation method, any alkali metal ions present in the gel as essentially formed can be removed from the wet gel which is then dried and calcined.

Another method of preparing the silica-alumina hydrogel or xerogel comprises first preparing a silica hydrogel by treating an alkali metal silicate with an acidic material such as hydrochloric acid, sulfuric acid, nitric acid or the like, adding a solution of a soluble aluminum salt such as aluminum sulfate to the silica hydrogel and then adjusting the pH of the mixture to precipitate alumina onto the silica gel by the addition of an alkaline material preferably dilute aqueous ammonium hydroxide. After washing to remove undesirable metal ions, the mixed silica-alumina gel may be employed as such, e.g. as the hydrogel, and then admixed with the previously treated and finely divided calcium oxide powder. Alternatively, the hydrogel may be slurried in water and then admixed with calcium oxide. A still further alternative may be found in drying the washed silica-alumina gel to form the xerogel which is then reslurried in water to about 20% solids and then admixed with calcium oxide.

The calcium oxide employed in the process of this invention is one which is substantially free of undesirable metal ions, e.g., iron, lead, etc. Finely divided calcium oxide, preferably having a particle size of less than one $\mu$, is employed. Preferably, the calcium oxide employed has been previously calcined, although this may not be absolutely necessary.

The source of the silica employed in this invention is usually commercial water glass. However, any other sodium silicate or potassium silicate may be employed with equally good results. A typical silicate solution suitable for the practice of this invention consists essentially of 28.5% $SiO_2$ and 8.9% $Na_2O$, the remainder being water. However, other silicate solutions having varying $SiO_2$ and $Na_2O$ percentages are equally suitable.

The silica can be precipitated by addition to an aqueous solution of the silicate of any dilute acid such as, for example, sulfuric or hydrochloric acid. The concentration of the silicate and/or acid can be varied to alter the pore volume and surface area of the finished catalyst. Preferably, dilute sulfuric acid is employed, i.e. at a concentration of from about 20 to about 40%, although higher concentrations can be used. The concentration of the silicate solution may vary from about 2 to about 7% $SiO_2$.

The silica hydrogel so obtained upon precipitation is then coated with alumina obtained from aluminum sulfate and/or sodium aluminate to obtain a silica alumina hydrogel which is then washed. This hydrogel or a slurry of the hydrogel may be reacted directly with finely divided calcium oxide. Alternatively, the washed hydrogel may be spray dried so as to obtain a silica alumina xerogel. A slurry of the xerogel may be then reacted with the calcium oxide. Reaction times of from two to eight hours at a temperature between about 30 to about 100° C., preferably 75° C., are generally employed.

Following the obtaining of the silica-alumina-calcia composite, a slurry containing the same is then dried to obtain the finished catalyst in microspheroidal form. Rapid drying by spray drying is preferred for such composite obtained from the hydrogel. Flash drying or other suitable drying technique is preferred for the composite obtained from the xerogel. Although gas inlet temperatures up to 1300° F. have been used with success, the temperature of the dry gases entering the spray drying or flash drying chamber is preferably controlled within the range of about 500° F. to about 1000° F.

After the drying procedure, spray dried or flash dried microspheres may then be employed directly in a fluid bed cracking converter. Usually, however, the silica-alumina-calcia microspheres are calcined, preferably at 1100° F. prior to being admitted to the converter.

In order to illustrate the features of the present invention, the following examples are given.

EXAMPLE 1

A sodium silicate (28.5% $SiO_2$ and 8.9% $Na_2O$) solution diluted to a specific gravity of 1.040 is mixed with a sulfuric acid solution having a specific gravity of 1.175. Approximately 2500 parts by weight of the sodium silicate solution is mixed with 250 parts by weight of the sulfuric acid solution. The resulting silica hydrogel is impregnated with alumina from 300 parts of 1.0837 specific gravity aluminum sulfate and 70 parts of 30% sodium aluminate, washed and spray dried. One portion of the spray dried silica-alumina is calcined at 1100° F. for one hour while another portion is reserved for use in the following examples.

EXAMPLE 2

A water slurry of a portion of the xerogel obtained in Example 1 which was not calcined is prepared by the addition of 95 parts by weight of xerogel to 380 parts by weight of water. Five parts of finely divided calcium oxide is mixed with the silica-alumina xerogel slurry for four hours at 75° C. after which the coated xerogel is flash dried. The resultant silica-alumina-calcia composite is then calcined at 1100° F. for one hour. The catalyst prepared in accordance with this procedure had the following composition:

| | Percent |
|---|---|
| Silica | 72.5 |
| Alumina | 22.5 |
| Calcia | 5.0 |

EXAMPLES 3 AND 4

The procedure of Example 2 is repeated in all essential respects except that the respective amounts of xerogel and calcium oxide employed in Example 3 are 97 and 3 parts and in Example 4, 99 and 1 parts.

Comparing a typical catalyst of this invention with a silica-alumina catalyst and a commercially available silica-alumina-magnesia catalyst, a substantially better distribution of products is obtained as in shown by the results in accompanying Table I based on test data. Thus, increase in gasoline ($C_{5+}$) yield and decrease in coke yield are significantly realized utilizing a silica-alumnia-calcia catalyst of this invention.

*Table I.—Steamed product distribution*

| Composition | Example 1 | Commercially Available Silica Alumina Magnesia Cracking Catalyst | Example 3 |
|---|---|---|---|
| Percent CaO | 0 | 0 | 3 |
| Percent MgO | 0 | 3 | 0 |
| Percent $Al_2O_3$ | 25 | 20 | 23.5 |
| Products: | | | |
| $C_2+$ (Lighter fractions) | 1.64 | 2.03 | 1.70 |
| $C_3$ (Propene) | 4.92 | 3.88 | 4.28 |
| $C_3$ (Propane) | 1.30 | 1.47 | 0.95 |
| $C_4$ (Butene) | 4.42 | 3.84 | 4.05 |
| $C_4$ (Isobutane) | 2.92 | 3.84 | 2.50 |
| $C_4$ (n-Butane) | 0.53 | 0.48 | 0.37 |
| C (Coke) | 3.00 | 2.20 | 1.90 |
| $C_{5+}$ (Gasoline) | 40.0 | 40.9 | 43.0 |

An analysis of the data in Table II illustrating ratios of unsaturated to saturated hydrocarbon products formed more clearly points up the improved selectivity afforded by a silica-alumina-calcia catalyst over a silica-alumina catalyst and a silica-alumina-magnesia catalyst. Also, an examination of the ratios of gasoline to unsaturated hydrocarbon products and gasoline to coke indicates that the improved selectivity of the silica-alumina-calcia catalyst is at the expense of coke rather than at the expense of unsaturated hydrocarbon products. By contrast, the silica-alumina-magnesia catalyst affords approximately the same gasoline to unsaturates ratio but the lower gasoline to coke ratio evidences that more coke is being produced.

*Table II.—Ratio of hydrocarbon products*

1. UNSATURATES TO SATURATES

| Added Promoter | $\dfrac{propene}{propane}$ | $\dfrac{butene}{n\text{-}butane}$ | $\dfrac{butene}{iso\text{-}butane}$ |
|---|---|---|---|
| Silica-alumina base—none (Example 1) | 3.78 | 8.33 | 1.51 |
| 1% CaO (Example 4) | 3.48 | 10.05 | 1.56 |
| 3% CaO (Example 3) | 4.50 | 10.95 | 1.62 |
| 5% CaO (Example 2) | 4.55 | 13.40 | 1.62 |
| 3% MgO—Commercially available silica alumina-magnesia cracking catalyst | 2.64 | 8.01 | 1.00 |

2. GASOLINE TO UNSATURATES AND COKE

| Added Promoter | $\dfrac{gasoline}{propene}$ | $\dfrac{gasoline}{butene}$ | $\dfrac{gasoline}{coke}$ |
|---|---|---|---|
| Silica-alumina base—none (Example 1) | 8.15 | 9.05 | 13.32 |
| 1% CaO (Example 4) | 9.05 | 9.20 | 18.90 |
| 3% CaO (Example 3) | 10.05 | 10.61 | 22.60 |
| 5% CaO (Example 2) | 11.38 | 11.60 | 32.58 |
| 3% MgO—Commercially available silica alumina magnesia cracking catalyst | 10.52 | 10.62 | 18.55 |

While this invention has been described in conjunction with various preferred embodiments, it is to be understood that the invention is not to be solely limited thereto but is to be construed broadly and restricted only by the appended claims.

I claim:

1. A process for preparing a silica-alumina-calcia catalyst which comprises (1) reacting in aqueous media finely divided calcium oxide with a silica alumina gel to form a silica-alumina-calcia composite, (2) drying and (3) calcining said composite.

2. A process for preparing a silica-alumina-calcia catalyst which comprises (1) reacting in aqueous media finely divided calcium oxide with a silica-alumina gel to form a silica-alumina-calcia composite, (2) drying and (3) calcining said composite, said reacting being for a period from 2 to 8 hours at a temperature of about 30° C. to about 100° C., said calcium oxide being substantially free of iron and lead ions.

3. A process as in claim 2 in which the amount of finely divided calcium oxide so reacted is such so as to provide from about 1 to about 5% of said silica-alumina-calcia catalyst.

4. A catalyst prepared in accordance with the process of claim 2.

5. A catalyst prepared in accordance with the process of claim 3.

6. A process for preparing a silica-alumina-calcia catalyst which comprises (1) reacting in aqueous media (a) a silica-alumina gel with (b) a finely divided calcium oxide in an amount sufficient to form a silica-alumina composite containing from about 1% to about 10% of said calcium oxide, (2) drying and (3) calcining said composite, said reacting being for a period from 2 to 8 hours at a temperature of about 30° C. to about 100° C., said calcium oxide being substantially free of iron and lead ions.

7. A catalyst prepared in accordance with the process of claim 6.

References Cited by the Examiner
UNITED STATES PATENTS
2,456,072   12/48   Morisic _____ 208—120

DELBERT E. GANTZ, *Primary Examiner.*

ALPHONSO D. SULLIVAN, PAUL M. COUGHLAN,
*Examiners.*